Dec. 5, 1967     J. W. BATTLES ETAL     3,356,968

MILLIMETER PHASE SHIFTER AND ATTENUATOR

Filed Sept. 29, 1965

JAMES W. BATTLES
DELBERT E. CRANE
*INVENTORS.*

BY *J. M. St. Amand*

3,356,968
MILLIMETER PHASE SHIFTER AND ATTENUATOR
James W. Battles, Riverside, and Delbert E. Crane, Norco, Calif., assignors to the United States of America as represented by the Secretary of the Navy
Filed Sept. 29, 1965, Ser. No. 491,465
4 Claims. (Cl. 333—30)

The invention herein described may be manufactured and used by or for the Government of the United States of America for governmental purposes without the payment of any royalties thereon or therefor.

The present invention relates to apparatus for the measurement of the complex dielectric constant of various materials at millimeter wavelengths.

There are no other devices that can be used as variable phase shifters on quasi-optical systems at these wavelengths. The instant device can be used to correct the phase of the wave in one arm of an interferometer; it can also be used in almost any coherent source system needing a variable phase shifter or attenuator.

The present invention is constructed from two identical prisms that are placed together to form a rectangular block. The prisms are placed on a mechanism that drives the prisms in opposite directions along their diagonals resulting in a change of thickness of dielectric a wave must pass through without deviation of the original path of the wave. This changes the phase of the wave. If the prisms are made from a lossy material, it attenuates the wave.

It is an object of the invention to provide a novel millimeter phase shifter.

Another object of the invention is to provide a novel attenuator device.

A further object of the invention is to provide a novel device for changing the phase and attenuation of the millimeter electromagnetic wave.

Other objects and many of the attendant advantages of this invention will become readily appreciated as the same becomes better understood by reference to the following detailed description when considered in connection with the accompanying drawings wherein.

Referring now to the drawings, like reference characters refer to like parts in each of the figures.

Figure 1:
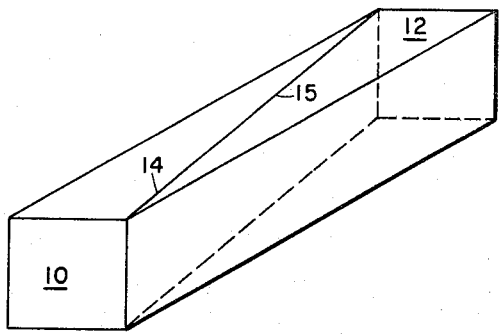
FIG. 1 is an illustration of two identical prisms placed together to form a rectangular block.

The instant device is made from two identical wedge shaped prisms 10 and 12. The prisms are mounted to form a rectangular block, as shown in FIG. 1, with their respective surfaces 14 and 15 in contact with each other. Surfaces 14 and 15 are slidably movable in relation to each other within their plane of contact while at least a portion of their surfaces always remain in contact. For example, prism 10 can be mounted stationary on a mount 16 while prism 12 is mounted for movement along a track 18 in mount 16 by any suitable calibrated drive means such as drive means 19. Face A of prism 10 and face B of prism 12 are parallel and matched to free space so that there will be no reflected wave from these surfaces. As can be seen from FIGS. 2 and 3, face A and face B of the prisms are always parallel to each other and remain normal to the path of the electromagnetic waves, thus keeping the path of the electromagnetic waves constant at all times. The prisms 10 and 12 can be made from any suitable transparent or semitransparent materials, such as polystyrene, Teflon, Plexiglas, or Lucite, for example. Matching techniques of this type are well known in the art; a full discussion of such techniques is given in "Some Methods of Preventing the Reflection of Electromagnetic Waves at the Boundary Between Two Dielectrics" by R. H. Garnham, August 1951 (T. R. E. Technical Note 131 from Telecommunications Research Establishment G. T. Malvern, Worcester, England).

Figure 2:
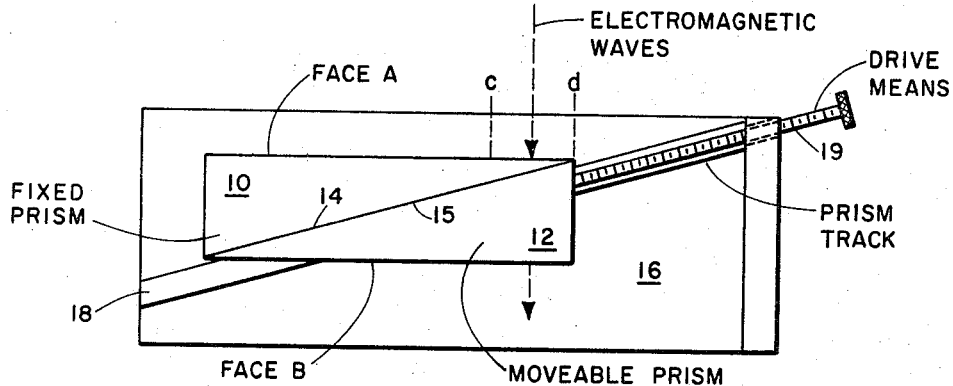
FIG. 2 is a side view of the prisms of FIG. 1 shown as a rectangular plane with their adjacent faces forming a diagonal line, and mounted such that one prism is movable with respect to the other along the diagonal.
Figure 3:
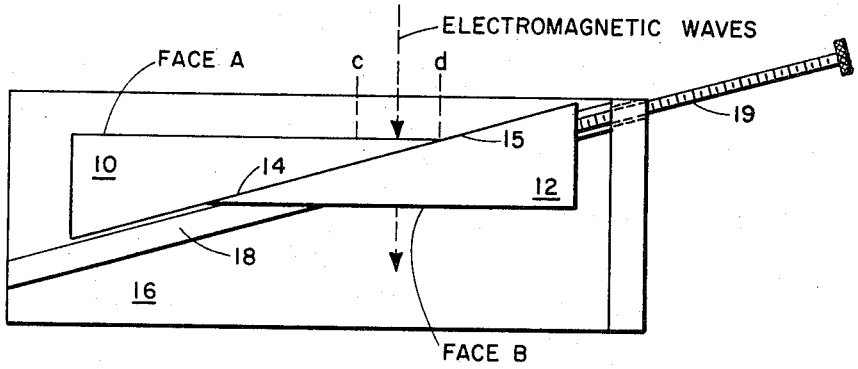
FIG. 3 is a side view as in FIG. 2 but showing one prism moved with respect to the other along the diagonal.

By moving prisms 10 and 12 in opposite directions to each other, such as shown in FIG. 3, the distance between face A and B is decreased from what it was in FIG. 2. Therefore, by moving these prisms a wave entering between points c and d on face A can have its path length through the prisms to face B changed without deviation of path direction or position at any time as illustrated in the drawings.

The phase of millimeter electromagnetic waves and the amount of attenuation of the waves depend upon the path length.

A collimated beam of millimeter electromagnetic waves, from any suitable source, such as microwave horn and collimating lens system, not shown, incident and normal to surface A will pass through both prisms and exit normal to face B. There is no bending of the beam. The distance between points c and d is usually chosen to be equal to or greater than the beam width used, and the movement of the prisms is limited such that a portion of both prisms extends between points c and d in order that the beam always passes through both prisms.

When this device is to be used only as a phase shifter, prisms 10 and 12 should be made from any dielectric material that is transparent (i.e., having very low loss) to millimeter electromagnetic waves.

For use as an attenuator the prisms should be made from a highly lossy material that is only partially transparent to electromagnetic waves. In such case the device can be used as both an attenuator and also a phase shifter since the prisms are partially transparent to the waves.

Such devices as the instant invention allow construction of simple adjustable quasi-optical phase shifters and phase attenuators, or both, permitting more versatile circuits to be employed at millimeter frequencies.

Obviously many modifications and variations of the present invention are possible in the light of the above teachings. It is therefore to be understood that within the scope of the appended claims the invention may be practiced otherwise than as specifically described.

What is claimed is:
1. A device for changing the phase of a collimated beam of millimeter electromagnetic waves, comprising:
  (a) a pair of identical wedge-shaped prisms of very low loss dielectric material that is transparent to millimeter electromagnetic waves,
  (b) said prisms having their respective inclined surfaces placed together in contact with each other such that the prisms form a rectangular block,
  (c) a respective outer surface of each of said prisms forming opposite parallel rectangular outer faces of said rectangular block and being matched to free space,
  (d) said prisms being mounted such that the prisms while remaining in constant contact with each other can be moved with respect to each other along their plane of contact while said respective outer surfaces always remain parallel to each other,
  (e) means for moving at least one of the prisms in an opposite direction with respect to the other for changing the normal distance and thus the thickness of the dielectric material between said opposite parallel rectangular faces,

(f) the phase shift of a collimated beam of millimeter electromagnetic waves incident normal to said outer faces, said outer faces being matched to free space, and passing through said pair of prisms being varied by moving one said prism with respect to the other to change the path length that the beam must pass through between said opposite outer faces matched to free space which always remain normal to said beam, thus changing the phase thereof without any bending of the beam and without deviation of the path direction and position of the beam at any time.

2. A device for attenuating a collimated beam of millimeter electromagnetic waves, comprising:
   (a) a pair of identical wedge-shaped prisms of high lossy dielectric material that is only partially transparent to millimeter electromagnetic waves,
   (b) said prisms having their respective inclined surfaces placed together in contact with each other such that the prisms form a rectangular block,
   (c) a respective outer surface of each of said prisms forming opposite parallel rectangular outer faces of said rectangular block and being matched to free space,
   (d) said prisms being mounted such that the prisms while remaining in constant contact with each other can be moved with respect to each other along their plane of contact while said respective outer surfaces always remain parallel to each other,
   (e) means for moving at least one of the prisms in an opposite direction with respect to the other for changing the normal distance and thus the thickness of the dielectric material between said opposite parallel rectangular faces,
   (f) the attenuation of a collimated beam of millimeter electromagnetic waves incident normal to said outer faces, said outer faces being matched to free space, and passing through said prisms being varied by moving one said prism with respect to the other to change the path length that the beam must pass through between said opposite outer faces matched to free space which remain normal to said beam, thus changing the attenuation thereof without any bending of the beam and without deviation of the path direction and position of the beam at any time.

3. A device for phase shifting and attenuating a beam of millimeter electromagnetic waves, comprising:
   (a) a pair of identical wedge-shaped prisms of semi-lossy dielectric material,
   (b) said prisms having their respective inclined surfaces placed together in contact with each other such that the prisms form a rectangular block,
   (c) a respective outer surface of each of said prisms forming opposite parallel rectangular outer faces of said rectangular block and being matched to free space,
   (d) means for moving at least one of said prisms with respect to the other along their plane of contact while remaining in constant contact with each other and said respective outer surfaces always remain parallel to each other,
   (e) the phase shift and attenuation of a beam of electromagnetic waves incident normal to said outer faces, said outer faces being matched to free space, and passing through said pair of prisms being varied by changing the path length and thus thickness of the dielectric material between said opposite faces which remain normal to said beam, thus changing the phase and attenuation thereof without any bending of the beam and without deviation of the path direction and position of the beam at any time.

4. A device as in claim 3 wherein said prisms are made from materials such as polystyrene, Teflon, Plexiglas and Lucite.

References Cited

UNITED STATES PATENTS

| | | | |
|---|---|---|---|
| 2,716,190 | 8/1955 | Baker | 343—911 |
| 2,853,688 | 9/1958 | Leboutet | 333—81 |
| 2,887,684 | 5/1959 | Dexter et al. | 343—753 |
| 2,924,142 | 2/1960 | Normarski | 88—65 X |
| 2,974,561 | 3/1961 | Hardy et al. | 88—65 X |
| 3,005,983 | 10/1961 | Chandler | 343—753 |
| 3,209,288 | 9/1965 | Bashore et al. | 333—81 |

ELI LIEBERMAN, *Primary Examiner.*

HERMAN KARL SAALBACH, *Examiner.*

S. CHATMON, Jr., R. F. HUNT, *Assistant Examiners.*